(12) United States Patent
Sieron et al.

(10) Patent No.: US 7,788,631 B2
(45) Date of Patent: Aug. 31, 2010

(54) PROCESS AUTOMATION SYSTEM

(75) Inventors: Russell J. Sieron, Livonia, MI (US);
Bruce Morey, Ann Arbor, MI (US);
John Elster, Plymouth, MI (US)

(73) Assignee: General Dynamics Advanced Information Systems, Inc., Farifax, VA (US)

( * ) Notice: Subject to any disclaimer, the term of this patent is extended or adjusted under 35 U.S.C. 154(b) by 926 days.

(21) Appl. No.: 09/791,124

(22) Filed: Feb. 22, 2001

(65) Prior Publication Data

US 2001/0032108 A1 Oct. 18, 2001

Related U.S. Application Data

(60) Provisional application No. 60/184,570, filed on Feb. 24, 2000.

(51) Int. Cl.
*G06F 9/44* (2006.01)
*G06F 17/00* (2006.01)

(52) U.S. Cl. .................. 717/100; 717/101; 717/102; 706/45; 706/46; 706/47; 706/60; 706/61

(58) Field of Classification Search ............ 706/51; 702/183; 707/104.1; 714/31; 717/100–105; 705/7–9
See application file for complete search history.

(56) References Cited

U.S. PATENT DOCUMENTS

| | | | | | |
|---|---|---|---|---|---|
| 4,918,620 | A | * | 4/1990 | Ulug | 706/59 |
| 5,021,997 | A | * | 6/1991 | Archie et al. | 714/31 |
| 5,276,775 | A | * | 1/1994 | Meng | 706/51 |
| 5,442,792 | A | * | 8/1995 | Chun | 717/155 |
| 5,537,590 | A | * | 7/1996 | Amado | 1/1 |
| 5,701,400 | A | * | 12/1997 | Amado | 706/45 |
| 5,706,406 | A | * | 1/1998 | Pollock | 706/51 |
| 5,737,727 | A | * | 4/1998 | Lehmann et al. | 705/7 |
| 6,003,020 | A | * | 12/1999 | Hazlehurst et al. | 706/11 |
| 6,070,163 | A | * | 5/2000 | Malone et al. | 707/7 |
| 6,144,953 | A | * | 11/2000 | Sorrells et al. | 706/60 |
| 6,249,755 | B1 | * | 6/2001 | Yemini et al. | 702/183 |
| 6,253,208 | B1 | * | 6/2001 | Wittgreffe et al. | 707/104.1 |
| 6,298,327 | B1 | * | 10/2001 | Hunter et al. | 705/1.1 |
| 6,339,838 | B1 | * | 1/2002 | Weinman, Jr. | 717/1 |
| 6,430,538 | B1 | * | 8/2002 | Bacon et al. | 705/9 |
| 6,662,355 | B1 | * | 12/2003 | Caswell et al. | 717/103 |
| 7,461,049 | B2 | * | 12/2008 | Thompson et al. | 1/1 |
| 2001/0052108 | A1 | * | 12/2001 | Bowman-amuah | 717/1 |
| 2003/0144977 | A1 | * | 7/2003 | Suda et al. | 706/46 |

OTHER PUBLICATIONS

J. Wood, H. Wright, K. Brodie; "Collaborative Visualization," Proceedings of the conference on Visualization, Oct. 18-24, 1997, pp. 253-259.

R. Jordan et al, "cantata: A Data Flow Visual Language," 1995, downloaded Apr. 4, 2001 from www.cs.ioc.ee.

* cited by examiner

*Primary Examiner*—Insun Kang
(74) *Attorney, Agent, or Firm*—Steptoe & Johnson LLP

(57) ABSTRACT

A Process Automation System and accompanying method provides for the automated or semi-automated creation of workflow management procedures having an arbitrary number of tasks to be performed manually or via computer automation in specified sequences. Workflows are automatically or in a semi-automatic generated by prompting the user with valid choices. After creating the workflow, the system then acts as the executive for execution; initiating tasks, tracking status, and managing intermediate and final products. The capability is provided to define new products and tasks for the system via a graphical user interface.

13 Claims, 7 Drawing Sheets

Atomic Definitions of Tools

Recursive Reasoning Builds Workflow Management Procedure

Workflow Management Procedure Branch for a Single Input Image

PROCESS AUTOMATION SYSTEM

REFERENCE TO RELATED APPLICATION

This application claims priority from U.S. provisional patent application Ser. No. 60/184,570, filed Feb. 24, 2000, the entire contents of which are incorporated herein by reference.

FIELD OF THE INVENTION

This invention relates generally to workflow management wherein computer software is used to implement the automated control of multiple-step, non-real-time processes. More particularly, this invention creates and executes custom processing flows by relying on a knowledge-based system rather than user understanding.

BACKGROUND OF THE INVENTION

In many sophisticated product development processes, execution and oversight of the process is a significant portion of the production effort. Operators must be trained to understand production procedures and the use of individual tools. Supervisors must track and schedule production tasks. File and disk space management has been estimated to consume as high as 80 percent of the production labor time.

Workflow management is used to automate production systems. Workflow management has two major sub-fields, control of standard practices and creation of custom processing flows. Workflow management of standard practices is commonly applied to business processes, and generally consists of software in which one or more workflow procedures are embodied in the software. Workflow management of custom processing flows generally consists of systems to build procedures from a collection of tools. Such systems are commonly found in commercial image processing packages (Khoros, Erdas Imagine, AVS), and rely on the user to understand the processing and tools being used. Such image processing systems do not generally support the status and tracking needed for production.

Alternatively, workflow management can be performed manually, using tools for tracking status. When done manually, however, operators must track and record the location of all intermediate files, and production managers must control the movement of data between the different operating stages.

All of the existing methods for workflow management of custom processing flows require a great deal of knowledge and/or training on the part of the users. The user must be aware of the availability, use, and caveats of each software tool to be incorporated in the workflow procedure.

Depending upon the particular method being used, the user may also be responsible for tracking filenames of intermediate products, recording completion status information, and moving data between configured areas. The effort required to do this has been measured to be up to 40 percent of the total labor cost of the production.

SUMMARY OF THE INVENTION

This invention was developed in response to the needs set forth above, but with the recognition that production processes are constantly evolving due to the introduction of new tools and new products. The resulting Process Automation System according to the invention automatically creates and executes workflow management procedures for a variety of applications. Not only does the system handle lower-level tasks such as bookkeeping and file shuffling, it can also be used to dynamically develop new production procedures and guide the operators through them once created.

Broadly, the effectiveness of the process is twofold, in that it automatically or semi-automatically creates the workflow management procedure, and executes the procedure in an environment that provides the status, tracking and control needed for a production environment.

The system includes three main components:
Data and Tool Definition;
Work Order Creation; and
Work Order Execution.

In the Data and Tool Definition component, software tools and their inputs and outputs are defined to the system via a graphical user interface. This provides the information that the system needs to reason over how to create a workflow management procedures and dynamically generated user interfaces.

In the Work Order Creation component, the creation of the workflow management procedure is initiated by the user identifying the desired output product and the desired input products. The user may also provide the name of a previously stored, abstracted template to provide guidance and eliminate the need for some interaction in the semi-automatic operational mode. The Work Order Creation component recursively reasons backwards from the output product to the input products, determining what processing steps and intermediate products are needed to perform the processing. When multiple valid options exist, the user or the abstracted template is consulted for guidance. All prompting for inputs is done via dynamically generated graphical user interfaces, based upon the information entered to the data and tool definition component. Once a valid processing path exists for a single input, that path can be automatically replicated for similar inputs.

Once created, Work Order Execution is invoked to execute the series of tasks, and to monitor and control status. The Work Order Execution component is largely based upon the WPEP Scheduler, built by Russell Sieron in 1996. Additional capabilities were created as part of this development that interface with the Process Automation System database and partition workflow management procedures into blocks of processing steps.

DETAILED DESCRIPTION OF THE INVENTION

The Process Automation System according to the invention provides a software utility for the creation and execution of workflow management procedures. It is useful in a multitude of applications, and is currently being applied in the field of image processing and geospatial information production (under the tradename GeoWorx™). A current implementation consists of C and JAVA source code designed for use in the UNIX operating system environment. It is currently implemented for Solaris 2.6 on a SUN workstation. The system integrates the following subsystems:

1. Manual Work Order Creation—the user interface for creation and execution of workflow management procedures and abstracted templates (called profiles);

2. Event Driven Work Order Creation—a command-line interface for creation and execution of workflow management procedures;

3. Work Order Interpreter—the logic engine that reasons over needed inputs and outputs and available tools to create them, and creates the workflow management procedure;

4. Run Control—the runtime control engine that analyzes the workflow management procedure for parallelism and creates the commands to execute the tasks;

5. Scheduler—the process management control executive that oversees process execution on each host, provides real-time and logged status, and provides for user intervention to reschedule or terminate jobs;

6. Database—a centralized database that holds the knowledge base for reasoning, catalogs of available input data, and processing logs;

7. Task Support—utilities for conveying status information back to Run Control; and 8. Product and Tool Registration—an application that provides a graphical user interface for registering new product types and tools in the system.

Among other differences to prior-art approaches, the Work Order Interpreter subsystem can be used to create a workflow management procedure by reasoning over the capabilities and dependencies of tools that perform specific tasks. Given the specification of the desired product and input(s), the Work Order Interpreter searches a database of known tools to determine the needed tools and their sequences to create the product from the inputs. Supported workflow procedure topologies include linear sequences, trees, and lattices. The Work Order Interpreter can be run in fully automatic mode, in which default selections are always made, or in semi-automatic mode, in which the user is allowed to choose among the valid choices available. Workflow management procedures can be stored in an abstracted form and recalled for later use with new inputs, even if the number of inputs has changed.

Figure 1:
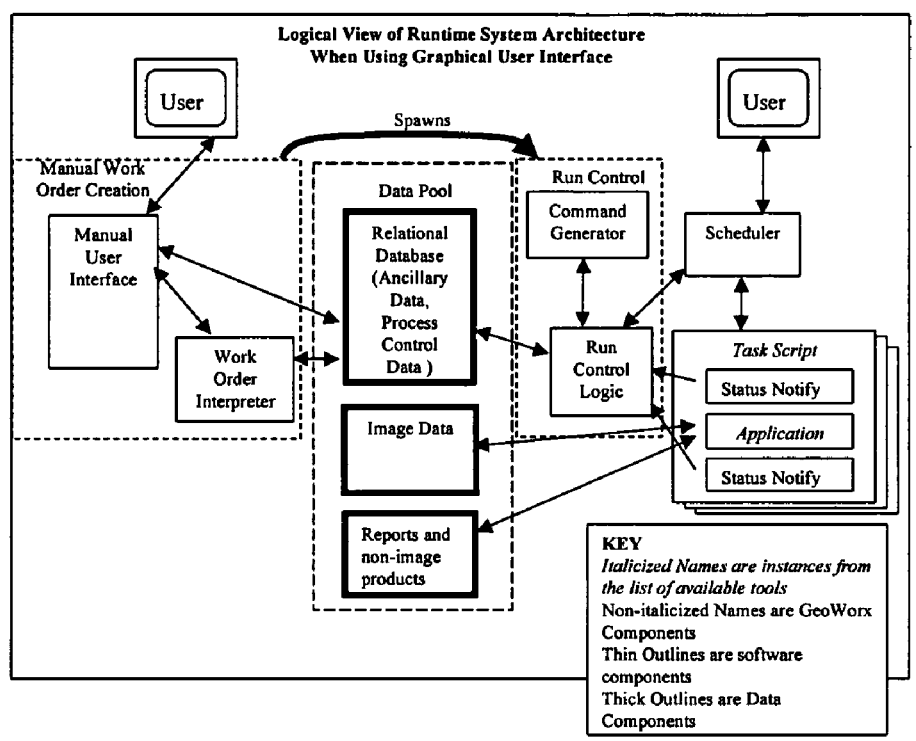
FIG. 1 depicts the logical structure of the system when used with the graphical user interface to create and execute a workflow management procedure.

FIG. 1 depicts the logical structure of the system when used with the graphical user interface to create and execute a workflow management procedure. The user interacts with an application that utilizes the Manual Work Order Creation, Work Order Interpreter, and Database subsystems. The user selects the desired type of output product and the input data from which to make it using the graphical user interface of this application. The user may optionally select to use a pre-stored abstracted template (profile) to provide further direction and defaults to the Work Order Interpreter.

The Work Order Interpreter then reasons through the creation of the workflow management procedure, stopping only to obtain inputs for information specific to the job (i.e. for what part of the Earth should the output product be made) or to resolve ambiguities if a profile is not provided. Once the potential workflow management procedure has been completed, the user is allowed to review and modify the procedure as desired. The workflow management procedure is then stored in the database and the run control application is spawned.

The run control application obtains the workflow management procedure from the database and analyses it for dependencies and parallelism. As each group of tasks that can be executed in parallel is reached, the control information in the workflow management procedure is converted into the proper commands to execute the task. The commands are then submitted to the scheduler for execution. The run control application is invisible to the user.

The scheduler manages the queue of submitted tasks on each host, ensuring that no more than the allowed number of concurrent tasks are being executed. The scheduler provides status information about the queue via a graphical user interface. This interface allows the user to view the stderr and stdout output of tasks, postpone tasks, and terminate tasks. Upon completion of each task, this stderr and stdout output is e-mailed to the user.

The task itself is run via a "task script," a shell script that acts as a wrapper to allow any application that can be run without a graphical user interface to be integrated into the system. The task script utilizes a UNIX command, StatusNotify, to transmit status information directly back to the run control application. Any application that cannot be run without its graphical user interface can be run as a "Manual Application." When a manual application is found within a workflow management procedure, e-mail is sent to the individual who was specified to perform the task when the workflow management procedure was created. The e-mail contains all of the instructions relevant to performing the task, such as the location of input files, the desired location of output files, and any special processing notes. The individual runs the graphical user interface to StatusNotify before processing begins. This confirms receipt of the message. The individual then performs the processing and runs StatusNotify to report the completion status.

Figure 2:
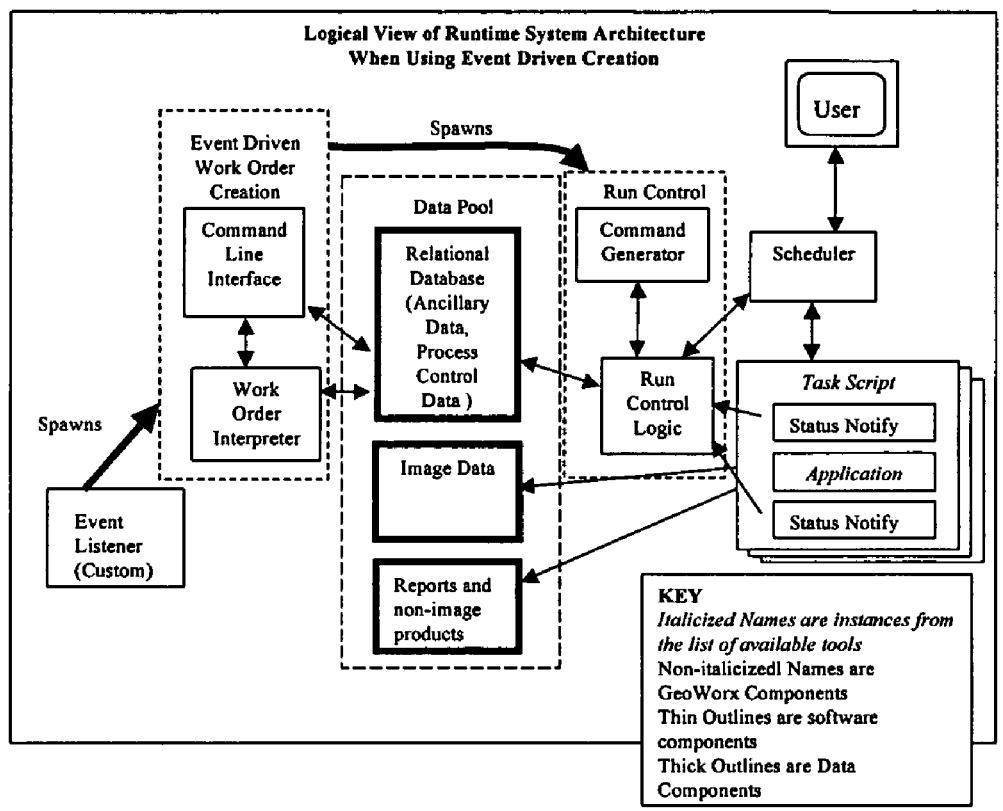
FIG. 2 depicts the logical structure of the system when run without the graphical user interface for workflow management procedure creation.

FIG. 2 depicts the logical structure of the system when run without the graphical user interface for workflow management procedure creation. The system is accessed via a command-line front-end that can be spawned from another process. All needed information is provided on the command line. The remainder of the processing proceeds as described above.

Figure 3:
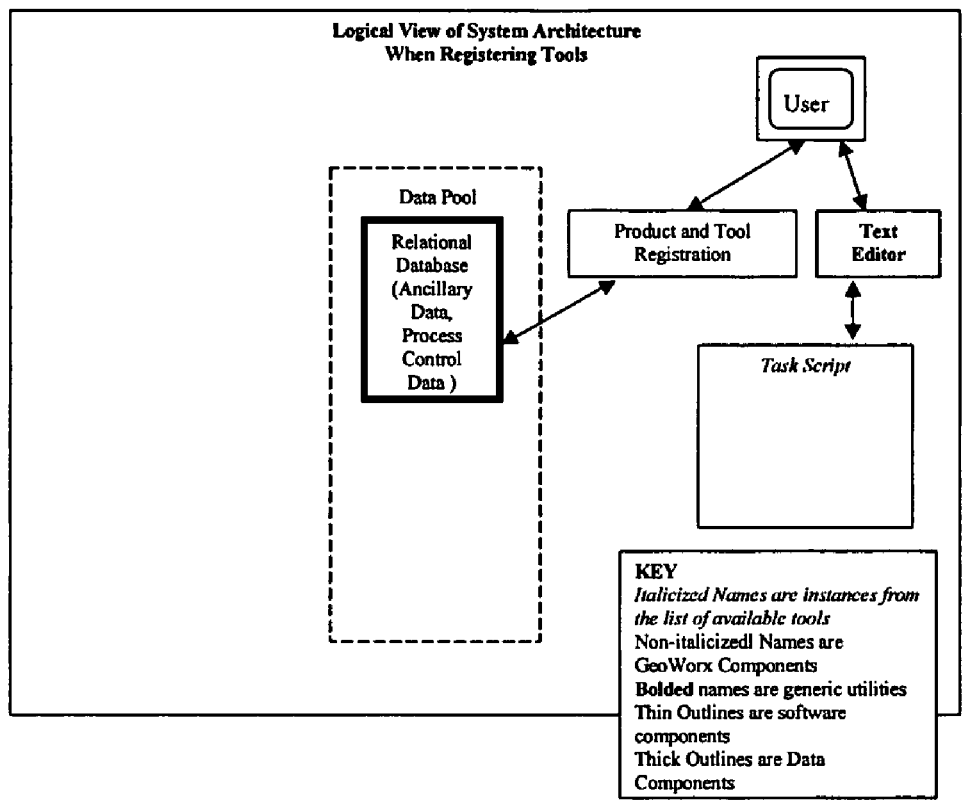
FIG. 3 shows a Product and Tools Registration step that provides a graphical user interface for various operations.

The Product and Tools Registration is used by software domain experts to register new product types and tools within the system. The logical flow of this capability is depicted in FIG. 3, which shows a Product and Tools Registration involving an application, AddProcedures, that provides a graphical user interface for all of these operations. A product is registered as a data type and the tools that are capable of creating that data type. A data type can also be registered to a data class, so that it can be recognized by tools that work on a variety of input data types. Examples of products could include orthorectified images, mosaics, change detection images, and countless other imagery and non-imagery products. Tools are registered by providing the name of the task script to execute the tool, a categorization of how to invoke the tool (command line, manual, prompt-and-respond, etc.), and a detailed description of the inputs, outputs and control parameters for the application. The language for making this description includes support for conditionally needed information, lists of information, multiplicity, and any permutation thereof. The user sees the language expressed as a tree, with graphical control of the tree layout and graphical user interface forms to provide the details for each tree node. In the process of defining the interface for the tool, the data type or class of all inputs and outputs is provided. This provides the information over which the Work Order Interpreter reasons. Task scripts are created using a standard text editor.

The Work Order Interpreter views each tool (procedure) as an atomic unit that outputs a specific type or class of product when provided with specific types or classes of inputs. The multiplicity of inputs and outputs is a characteristic of the tool. The Work Order Interpreter begins by considering the desired output product. It determines what tools are available to make the product. If multiple choices exist, it selects one based upon either defaults, the abstracted template (profile) provided it, or user intervention. The method of selecting is based upon the settings of three flags to control its processing. The selected choice is then examined to determine its needed inputs. This processing continues recursively until either a specified input item is found to fulfill the needed inputs, or it is determined that the product cannot be made from those inputs.

Figure 4:
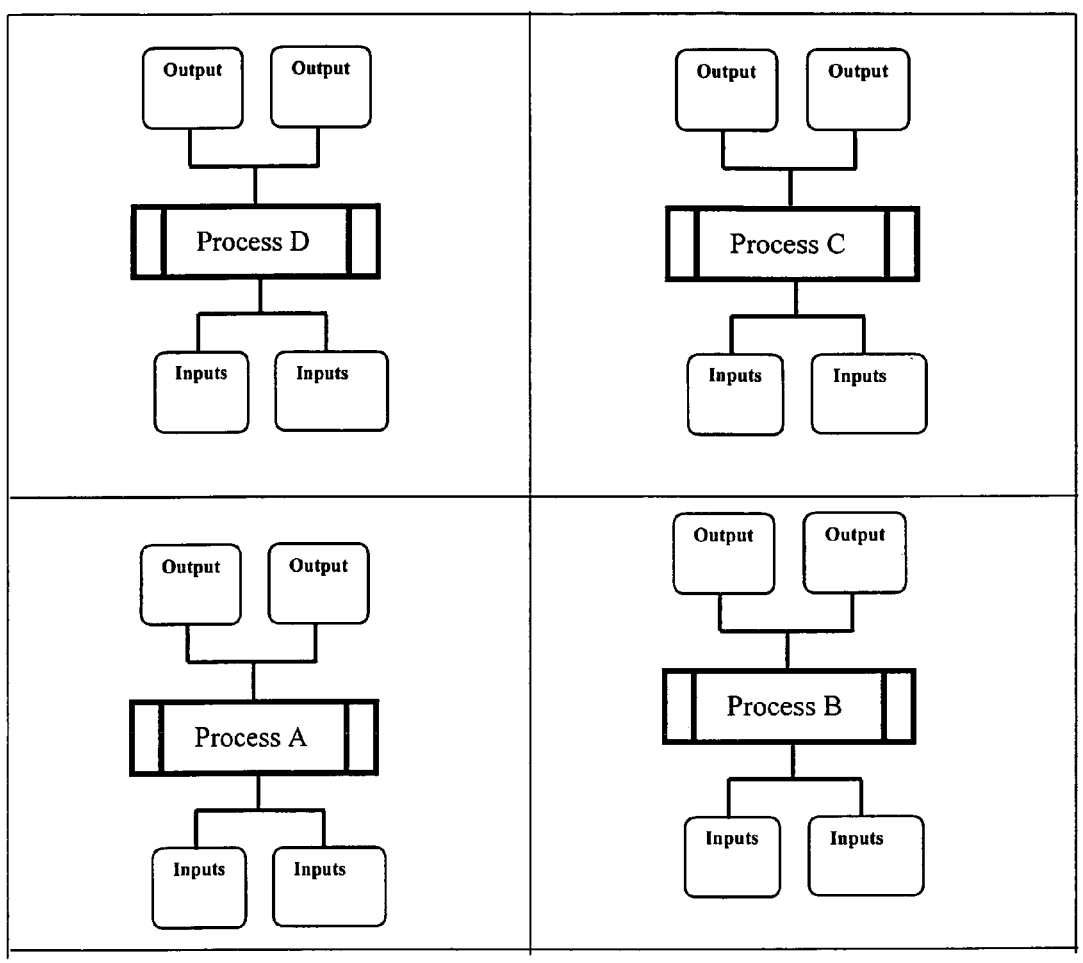
FIG. 4 is set of diagrams which illustrate the atomic definition of tools.
Figure 5:
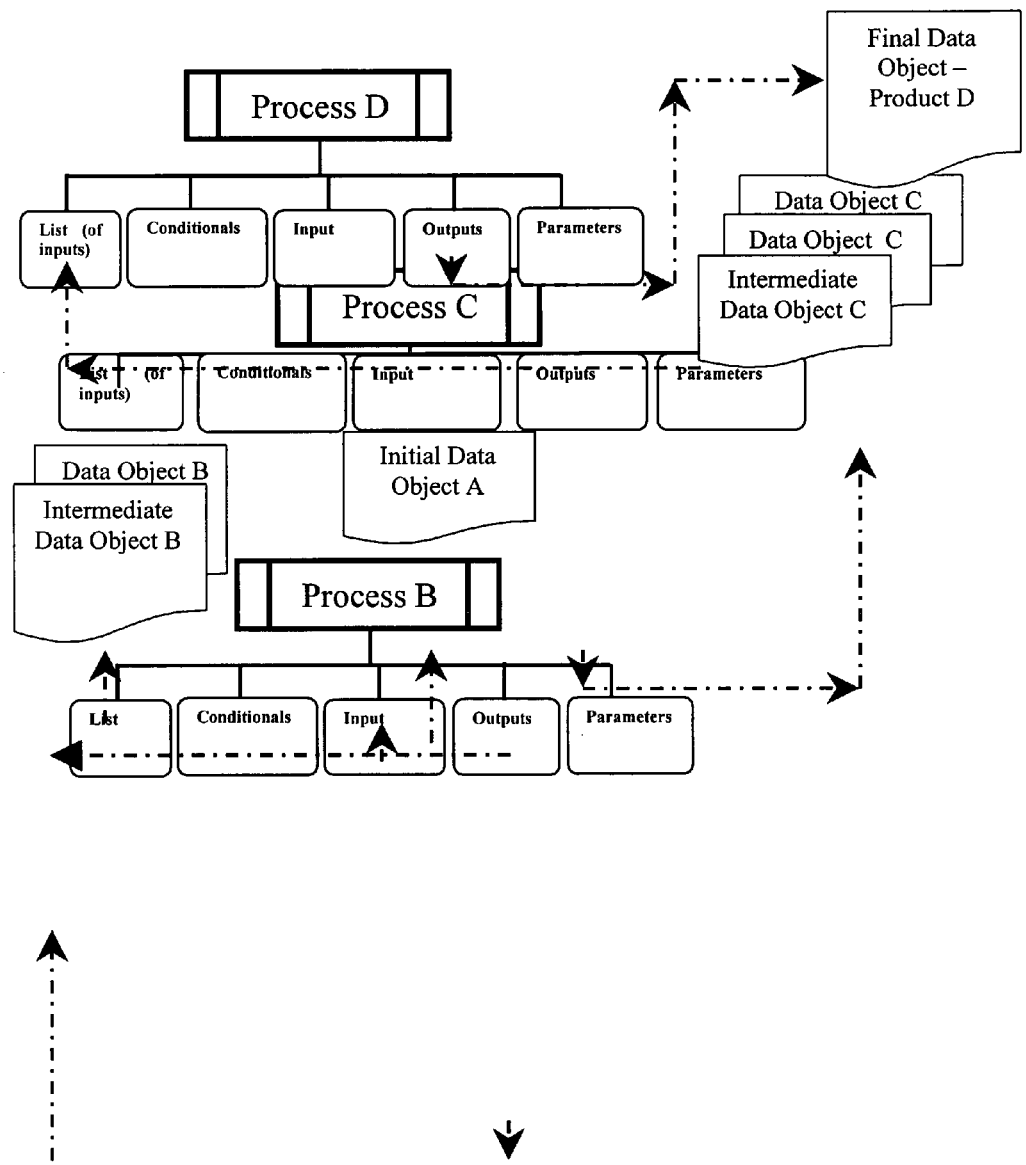
FIG. 5 shows how recursive reasoning may be used to build a workflow management procedure.
Figure 6:
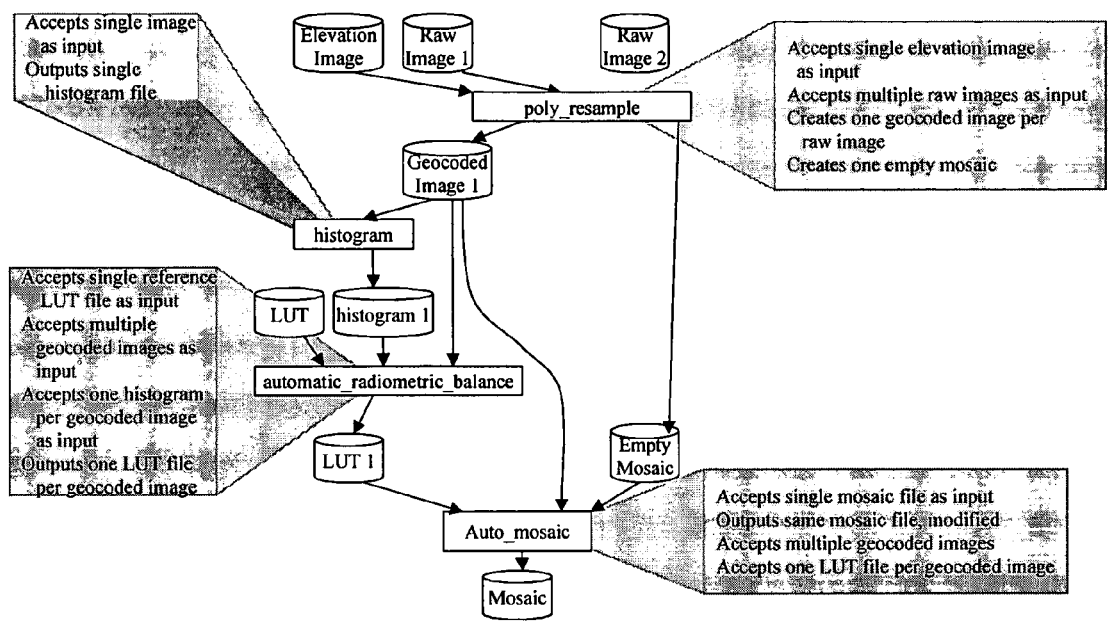
FIG. 6 shows a workflow management procedure for a single input image.
Figure 7:
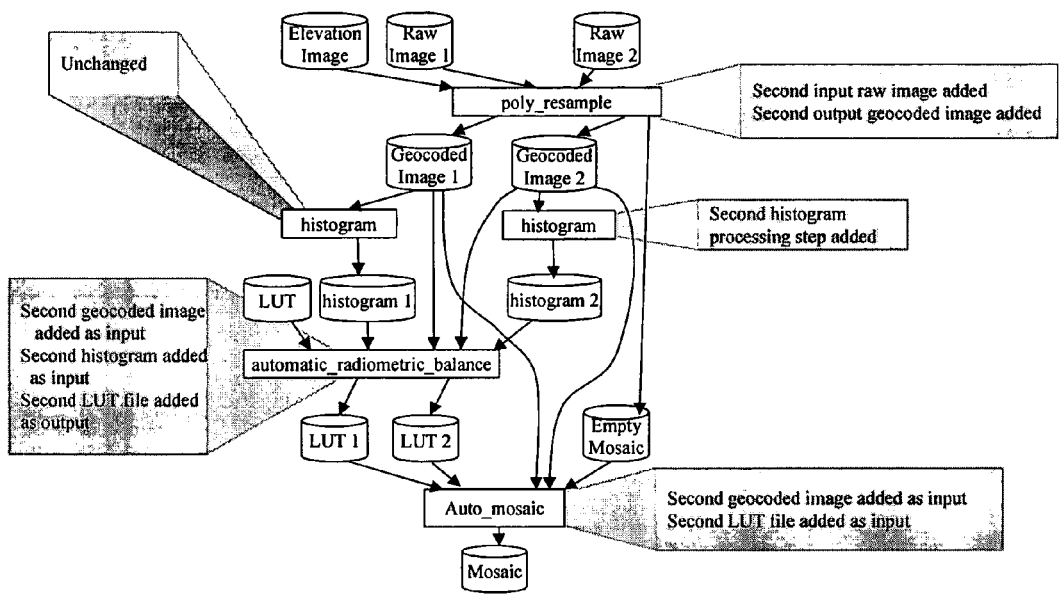
FIG. 7 illustrates a workflow management procedure following replication of a branch.

Additional ancillary inputs can be specified as needed. This processing is depicted in FIGS. 4 and 5. Once a processing flow has been established for a single input, then the remaining inputs are inspected to determine if they are of the same type. If one or more inputs of the same type exist, then the user is given the option of replicating the processing flow branch for the corresponding inputs. When a processing flow branch is replicated, each processing step is evaluated to determine if it can accept additional inputs and outputs or if a new instance of that processing step must be created. This processing is depicted in FIGS. 6 and 7. The resulting workflow management procedure can be a single sequence, a tree, a lattice, or any permutation of the preceding.

Some advantages of the Process Automation System described herein include:

- Automated reasoning guides the user through creating the workflow management procedure, greatly reducing the need for training and expert operators;
- Abstracted templates can store workflow management procedures for reuse, recalling preferences and processing structure;
- Abstracted templates are not based upon the number of inputs, they are dynamically reconfigured to match the number of inputs each time they are used;
- Command-line software tools can be given a graphical user interface without any modification, recompiling, or relinking of the tool;
- The system can automate the use of any software tool that does not require input through a graphical user interface, including operating system commands and tools from other vendors;
- Inherently manual processes may be integrated into automated processing flows by sending e-mail instructions to operators;
- Automated execution eliminates file handling and tracking by operators; and
- Status and tracking capabilities support the needs of production systems.

We claim:

1. A method of creating a workflow procedure, comprising the steps of:
   recalling a previously stored template associated with a prior workflow procedure;
   using a graphical user interface to customize the template by providing software tools, desired input products, and a desired output product associated with a new workflow procedure;
   recursively reasoning backwards from the output product to the input products to determine what processing paths and intermediate products will be necessary to perform the new procedure;
   prompting the user if processing paths are generated;
   if a valid processing path exists for a single input, automatically replacing that path for similar inputs;
   automatically replicating topology segments used to process a single input to satisfy multiple input tasks; and
   executing the procedure in accordance with the processing paths.

2. The method of claim 1, including tools featuring a mix of single and multiple inputs, such that the topology is linear, tree-like, a lattice, or any permutation thereof.

3. The method of claim 1, further including the step of wrapping any input that can be executed without a graphical user interface in a shell script to eliminate the need for recompiling, relinking, or otherwise altering the input.

4. The method of claim 1, further including the step of treating an input that requires a graphical user interface as a manual tool to eliminate the need for recompiling, relinking, or otherwise altering the input.

5. The method of claim 1, further including the step of pre-validating user specifications, such that only valid tasks and intermediate products are generated for the procedure.

6. The method of claim 1, further including the step of identifying the data products as data types and data classes for step of reasoning over input data requirements.

7. The method of claim 1, further including the step of identifying certain tools as accepting terms of a data class, and outputting items that belong to a data class, to allow for the efficient description of general-purpose tools.

8. The method of claim 1, further including the step of representing the user interface as a tree structure.

9. The method of claim 8, wherein the nodes of the tree may represent conditional nodes that select one of the underlying branches.

10. The method of claim 9, wherein the nodes of the tree may represent multiple occurrences of an item.

11. The method of claim 10, wherein the number of occurrences of an item may be tied to an arbitrary range or the number of occurrences of another item.

12. A method of creating a workflow procedure, comprising the steps of:
    recalling a previously stored template associated with a prior workflow procedure;
    using a graphical user interface to customize the template by providing software tools, desired input products, and a desired output product associated with a new workflow procedure;
    recursively reasoning backwards from the output product to the input products to determine what processing paths and intermediate products will be necessary to perform the new procedure;
    prompting, in response to said recursively reasoning encountering multiple valid options, user intervention to assist in determining said processing paths and said intermediate products;
    if a valid processing path exists for a single input, automatically replacing that path for similar inputs; and
    executing the procedure in accordance with the processing paths.

13. A method of creating a workflow procedure of claim 12, further comprising:
    receiving, in response to said prompting, additional information;
    completing said recursive reasoning based on at least said additional information.

* * * * *